United States Patent
Miller et al.

(10) Patent No.: US 8,297,453 B2
(45) Date of Patent: Oct. 30, 2012

(54) PLATFORM ASSEMBLY

(75) Inventors: James W. Miller, Fort Wayne, IN (US); Andrew J. Krum, Fort Wayne, IN (US); Bradley S. Kallaher, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 511 days.

(21) Appl. No.: 12/496,729

(22) Filed: Jul. 2, 2009

(65) Prior Publication Data

US 2011/0001336 A1   Jan. 6, 2011

(51) Int. Cl.
*A47B 43/00* (2006.01)
*A47B 57/00* (2006.01)
(52) U.S. Cl. ............................. 211/201; 211/190; 108/99
(58) Field of Classification Search .................. 211/186, 211/149, 187, 195, 198, 199, 200, 201, 190, 211/175, 208, 207; 108/42, 44, 99, 101, 108/179, 193; 296/190.08
See application file for complete search history.

(56) References Cited

U.S. PATENT DOCUMENTS

| | | | | |
|---|---|---|---|---|
| 812,074 A * | 2/1906 | McDonnell | | 108/99 |
| 1,562,089 A * | 11/1925 | Holley | | 108/101 |
| 2,447,704 A * | 8/1948 | Kline | | 108/110 |
| 2,569,716 A * | 10/1951 | Hawk et al. | | 108/1 |
| 5,257,701 A * | 11/1993 | Edelson | | 211/149 |
| 5,564,346 A * | 10/1996 | Robben | | 108/108 |
| 5,577,622 A * | 11/1996 | Kapteyn | | 211/133.1 |
| 5,746,331 A * | 5/1998 | Kurtis | | 211/149 |
| 5,755,411 A | 5/1998 | Strong, III | | |
| 5,833,308 A | 11/1998 | Strong, III | | |
| 6,145,447 A * | 11/2000 | Henderson | | 108/44 |
| 6,851,564 B2 * | 2/2005 | Ng | | 211/149 |
| 2007/0125736 A1 * | 6/2007 | O'Reilly | | 211/186 |

* cited by examiner

*Primary Examiner* — Darnell Jayne
*Assistant Examiner* — Stanton L Krycinski
(74) *Attorney, Agent, or Firm* — Jeffrey P. Calfa; Mark C. Bach (57) ABSTRACT

A platform assembly can be used in a motor vehicle, such as a truck, to support a person or objects. The platform assembly can have a frame with pivotal attachments to allow the frame to be at least partially collapsible. The platform can pivotally and removably attach to the frame.

3 Claims, 7 Drawing Sheets

FIG. 13

PLATFORM ASSEMBLY

BACKGROUND

Embodiments disclosed herein relate to platform assemblies, especially those used in motor vehicles.

Military vehicles are used both for off-road and highway to transport personnel, cargo and litter. These vehicles can be heavily armored and can have both a large payload capacity, such as 2.5 tons to 20 tons as well as carry troops.

Such vehicles are also designed with turrets to protect gunners or remotely controlled weapon stations. The turrets allow the gunner to load, operate and engage targets from fully protected positions.

Due to the height of the military vehicle's cab, the gunner is too short to stand on the floor while using the machine gun located above the roof of the cab in the turret. Therefore, a gunner must use a platform to use the gun in the turret. When using a fixed location platform, shorter gunners often look for something to stand on, such as ammunition boxes or other boxes to access the platform.

A platform, however, takes up a large amount of space within the cab, creating large inaccessible areas. A platform used at a high enough position for the gunner to reach the gun prevents the troops within the cab easy access to the roof hole, the gun turret or the roof hatch. The higher platform position is too high for troops to quickly enter the cab.

SUMMARY

A platform assembly for a motor vehicle having a back cab wall has a frame and a platform removably and pivotally fastening to the frame. The frame has a first front leg, a second front leg, a first back leg and a second back leg spaced apart from the first front leg and the second front leg and secured to the back cab wall. A first brace is pivotally attached to the first front leg and pivotally attached to the first back leg. A second brace is pivotally attached to the second front leg and pivotally attached to the second back leg. The platform has a first platform side, an opposite second platform side, a platform front being located between the first platform side and the second platform side, and a platform back opposite the platform front.

DETAILED DESCRIPTION

Figure 1:
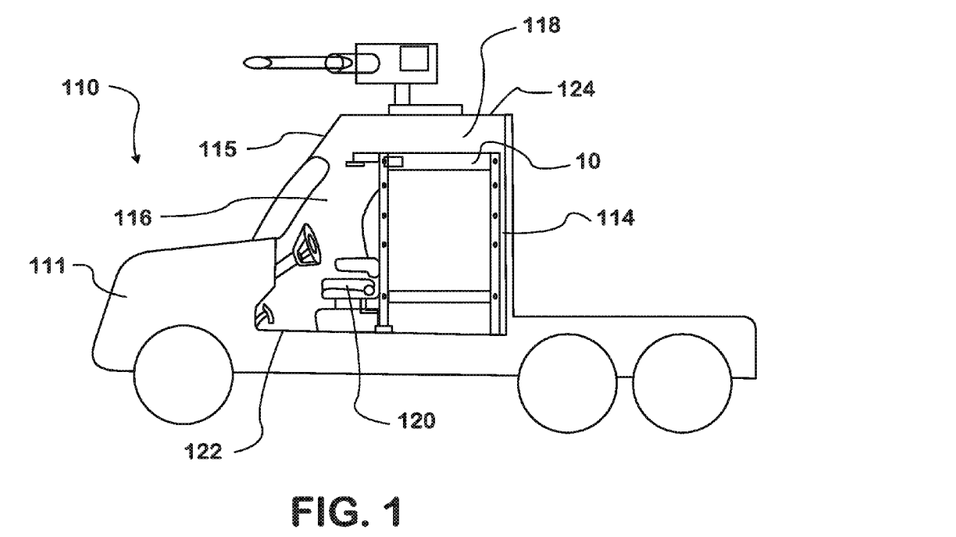
FIG. 1 is a partial side view of a motor vehicle with a platform assembly.
Figure 2:
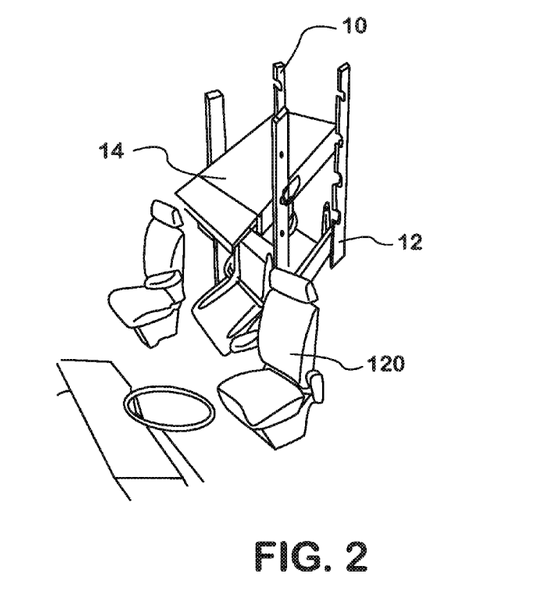
FIG. 2 is a partial perspective view of a motor vehicle with a platform assembly.

Referring now to the Figures where like reference numerals refer to like structures, a motor vehicle 110, such as a truck 111, has a cab 112 with a front cab wall 115, a back cab wall 114 and side cab walls 116 therebetween to form a cab enclosure 118. A roof 124 is located at the top of the cab enclosure 118 and a floor 122 at the bottom. A gun turret 126 is located on the roof 124. Located within the cab enclosure 118 are seats 120 attached to the floor 122. A platform assembly 10 is located behind the seats 120 and in front of the back cab wall 114.

Figure 12:
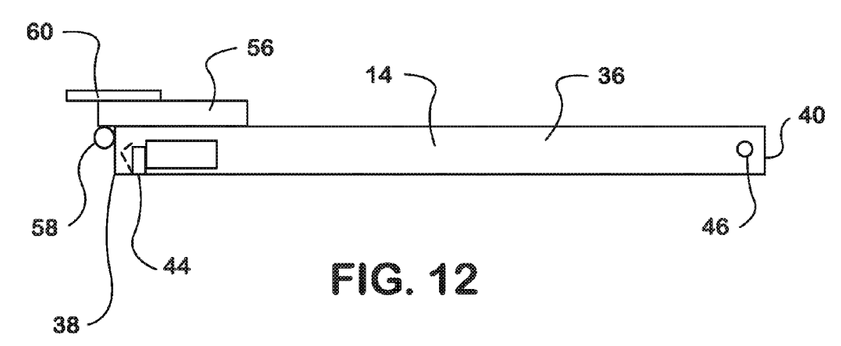
FIG. 12 is a side plan view of a platform with a platform extension attached and fully closed and an opening in the platform side in phantom.
Figure 13:
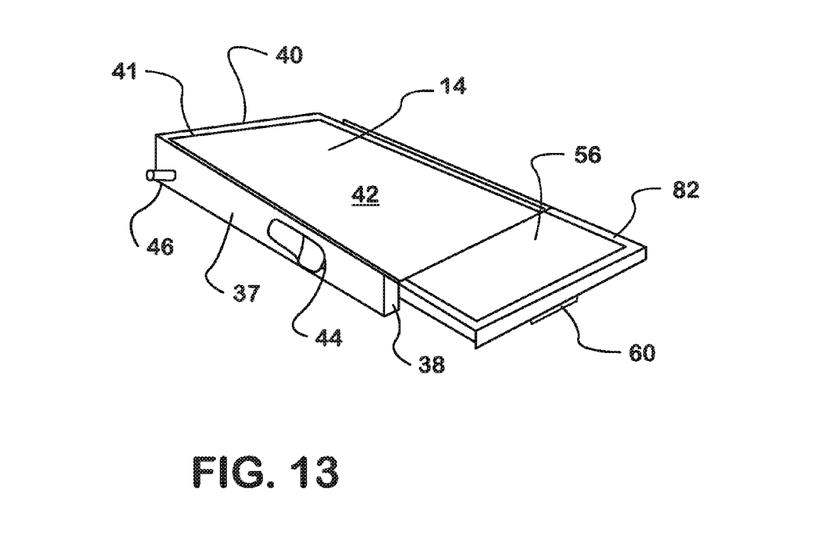
FIG. 13 is a perspective view of the platform with a platform extension attached and fully opened.

The platform assembly 10 has a platform 14 that is removable. Platform 14 has opposite first and second platform sides 36, 37. The first and second platform sides 36, 37 each have an opening 44 near a platform front 38. The platform front 38 and an opposite platform back 40 are located between the first and second platform sides 36, 37. A base 42 extends from the platform front 38 to the platform back 40 and the first and second platform sides 36, 37. The base 42 can have a lip 41 or other tactile device around the edge. Pegs 46 extend outwardly from the first and second platform sides 36, 37 of the platform 14 near the platform back 38.

Figure 3:
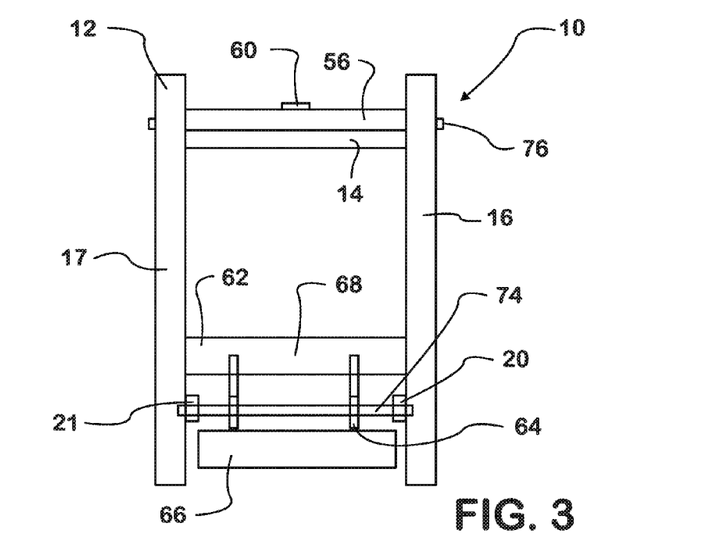
FIG. 3 is a front plan view of a platform assembly.
Figure 4:
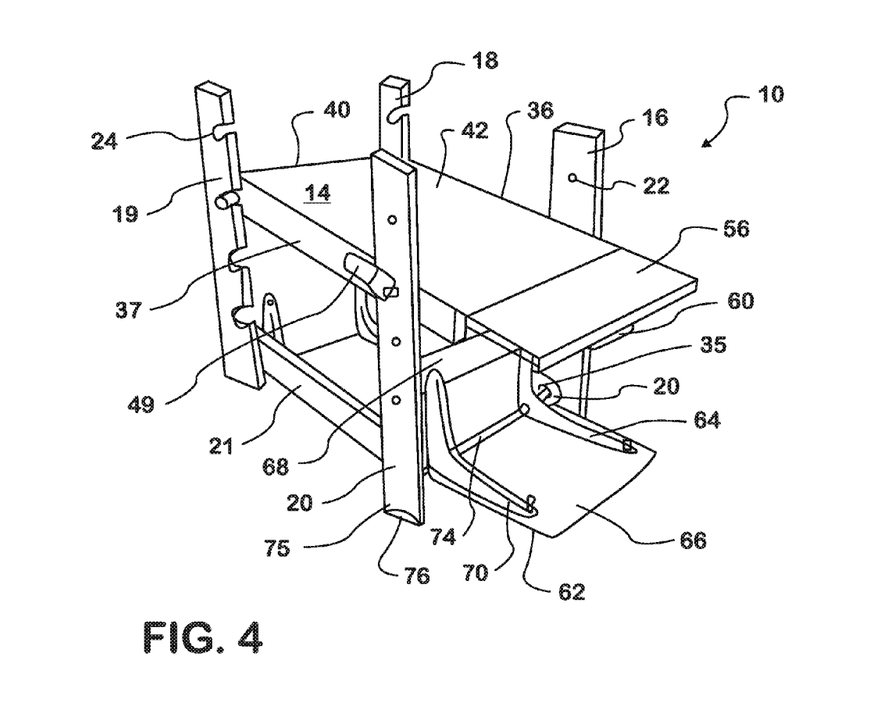
FIG. 4 is a perspective view of a platform assembly with the platform lowered.
Figure 10:
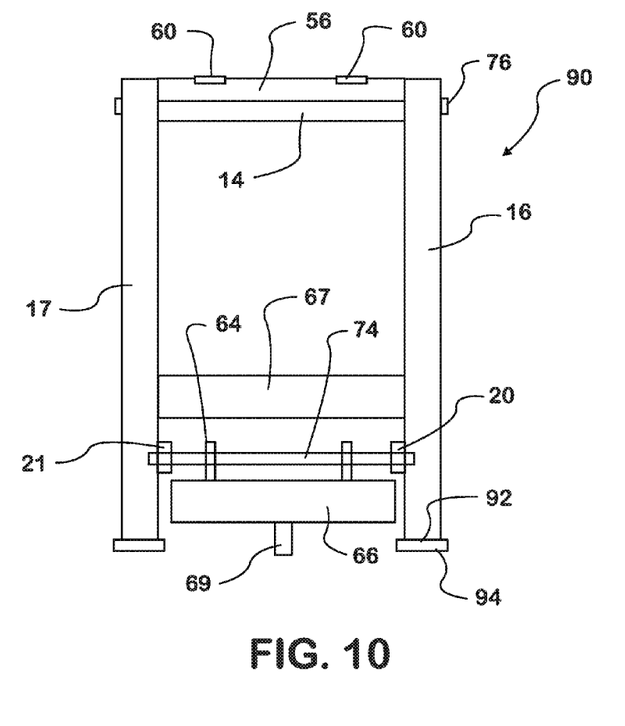
FIG. 10 is a front plan view of a platform assembly.

The platform assembly 10, 90 has a frame 12 removably and pivotally connected to the platform 14. The frame 12 has a pair of front legs 16, 17 and a pair of back legs 18, 19 secured to the back cab wall 114 and spaced apart from the front legs 16, 17. The first and second front legs 16, 17 are removably and pivotally fastened to the platform 14, such as with pins 76 engaging apertures 22 in the front legs 16, 17 and the openings 44 in the platform sides 36, 37. The apertures 22 are vertically arranged. Other structures can be also used, such as slots engaging pegs extending from the platform sides, or a locking mechanism in a slot, such as a spring lock, the use of pivot bolts with nuts, cotter pins or spring-loaded pins with a locking mechanism engaging the aperture, a bracket with bolts, and the like. Each of the first and second front legs 16, 17 can engage a receiver 77, 94 on the floor 122 of the vehicle 110, such as a footer 75, 92 on the front legs 16, 17.

Figure 5:
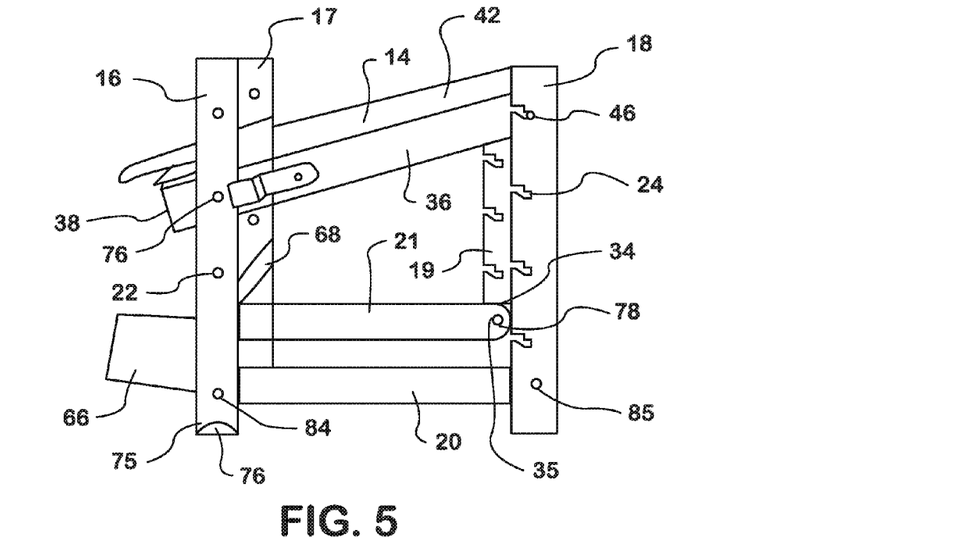
FIG. 5 is a side view of a platform assembly with the platform partially lowered.
Figure 9:
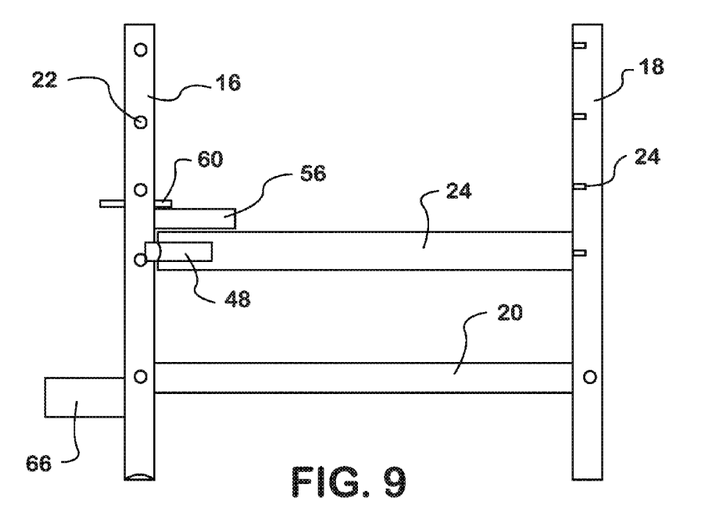
FIG. 9 is a side plan view of a platform assembly with the platform fully lowered.

Platform 14 removably and pivotally fastens to both the first and second back legs 18, 19. First and second back legs 18, 19 can have slots 24 that are vertically arranged. Each slot 24 can engage a peg 46 extending from the platform sides 36, 37 of the platform 14. The slot 24 can keep the peg 46 from disengaging during use. The slots 24 can be S-shaped, having a first portion 26 opening inwardly from an edge 30 of the back leg 18, 19, a second portion 27 leading downward to a third portion 28 opening inwardly from the second portion 27. Other mechanisms can be used, such as a spring lock in the slot, a pin engaging apertures in the back legs as discussed above, and the like.

Figure 6:
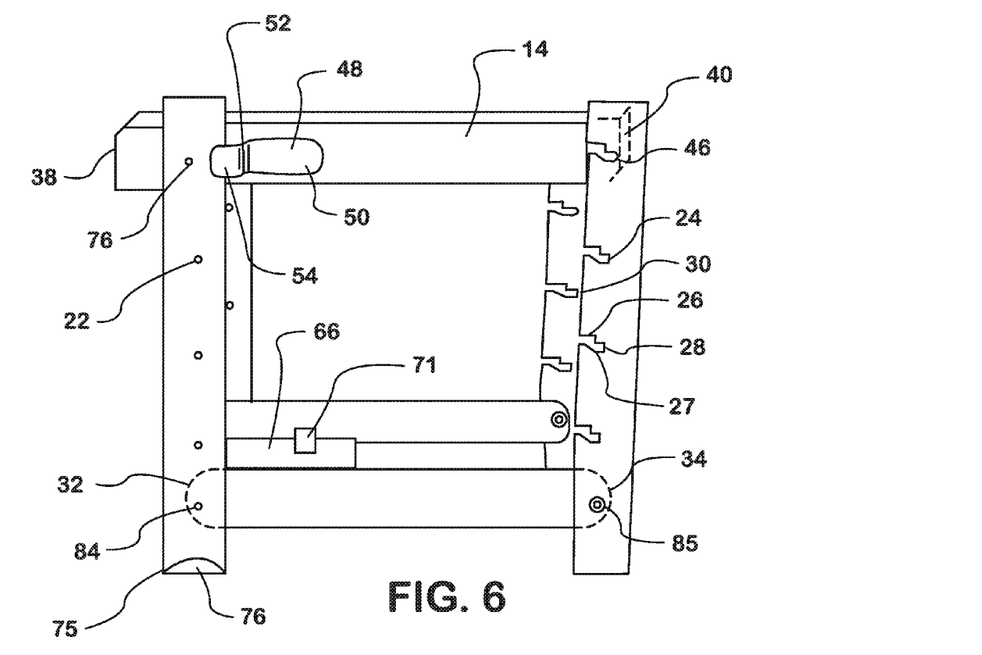
FIG. 6 is a side view of a platform assembly with the first and second end of the first brace in phantom and a platform without a platform extension fully raised with a step assembly retracted.

Braces 20, 21 pivotally attach to the front 16, 17 legs and the back legs 18, 19 in an approximately horizontal or diagonal position. Each brace 20, 21 has a first end 32 and an opposite second end 34. The first end 32 of the first brace 20 pivotally attaches to the first front leg 16. The second end 34 of the first brace 20 pivotally attaches to the first back leg 18. The first end 32 of a second brace 21 pivotally attaches to the second front leg 17. The second end 34 of the second brace 21 pivotally attaches to the second back leg 19. The pivotal attachment can be a pivot pin 78, cotter pin, or a pivot bolt engaging a brace hole 35 in the brace and a bore 85 in the back leg or a rod 74 engaging a brace hole 35 and a bore 84 in the front leg. A pivot bracket and pivot bolts can also be used to pivotally attach the legs to the braces, such as the back legs to the second end of the braces (not shown). The pivot bracket can have a pivot bore located at the bottom of the pivot bracket for receiving a pivot bolt. The pivot bolt inserts through the pivot bore in the pivot bracket and the brace hole or a bushing located within the brace hole. When assembled, a nut threads onto the threaded shank of the pivot bolt to lock the pivot bolt to the pivot bracket.

A first bracket 48 fastened to the first platform side 36 engages the first front leg 16. A second bracket 49 fastened to the second platform side 37 engages the second front leg 17. The first and second brackets 48, 49 can be S-shaped with a first bracket part 50 fastened to the platform side. A second bracket part 52 extends away from the first bracket part 50 toward a third bracket part 54 which engages the front leg.

A platform extension 56 pivotally connects to the platform front 38 with a pivot connector 58, such as one or more hinges, pivot brackets, and the like. The pivot connector can be on the top of the platform 14 and platform extension 56 or on the bottom of the platform 14 and platform extension 56. The platform extension 56 pivots with the pivot connector 58 from a closed position folded onto the top of the platform 14 to an open position extending outwardly from the platform front 38. The open position can align with the platform 14 and be approximately parallel to the floor 122. One or more extension supports 60 attached to the extension 56 extends outwardly past the pivot connector 58. When the extension 56 is in the open position, the extension support 60 engages the bottom of the platform 14. The platform extension 56 can have a lip 82 or other tactile device near or at the edge.

A step assembly 62 pivotally engages the frame 12. The step assembly 62 has two approximately parallel step brackets 64 engaging a step 66 at one end and a stop 68 at the other end. The step brackets 64 can be L-shaped with a rib 70 extending outwardly and a bracket opening 72 in the rib 70. Alternatively, a stop 69 can be located on the floor 122 of the cab 112 beneath the step 67 or a stop can be located on the step itself.

A rod 74 extends from the first front leg 16 through the first end 32 of the first brace 20 through the step brackets 64 on the step 66 and through the first end of the second brace 21 and to the second front leg 17. The step assembly 62 is in a retracted position with the stop 68 positioned downwardly and the step 66 positioned between approximately vertical to approximately horizontal and between the braces 20, 21. The step 66 can pivot on the rod 74 from the retracted position to a use position with the stop 68 positioned approximately vertical against the first and second front legs 16, 17 and the step 66 positioned approximately horizontal and away from the first and second front legs 16, 17.

Alternatively, step assembly 63 is in a retracted position when the step 66 is positioned at approximately vertical to approximately horizontal between the braces 20, 21. Step assembly 63 can pivot on the rod 74 from the retracted position to a use position with the step 67 positioned away from the first and second front legs 16, 17 and engaging a stop located on the floor 122 or a stop 69 attached to the step 67 engages the floor 122.

A second step 70 can be used. The second step can be attached to the step 66 or the second step 70 can attach to the front legs 16, 17.

To use the platform 14 of the platform assembly 10, the user can pivot the step 66 from the closed position. The platform extension 56 is in the closed position. The user steps onto the step 66 or steps 66, 70 to climb onto the platform 14. Once the user is on the platform, the user can pivot the platform extension into the open position.

To remove the platform 14, the user can remove the pins 76 from the apertures 22 of the front legs 16, 17. The user can then slide the pegs 46 from the slots 24 of the back legs 18, 19 and remove the platform 14 from the platform assembly 10.

To adjust the height of the platform 14, the user can slide the pegs 46 from the slots 24 of the back legs 18, 19. The user can raise or lower the platform back 40 to the desired height, then reinsert the pegs 46 into the slots 24 at the desired height. The user can next remove the pins 76 from the apertures 22 of the front legs 16, 17. The user can move the platform front 38 to the desired height, then reinsert the pins 76 into the apertures at the desired height. The height of the platform 14 can also be adjusted by first removing the pins rather than the pegs.

Figure 7:
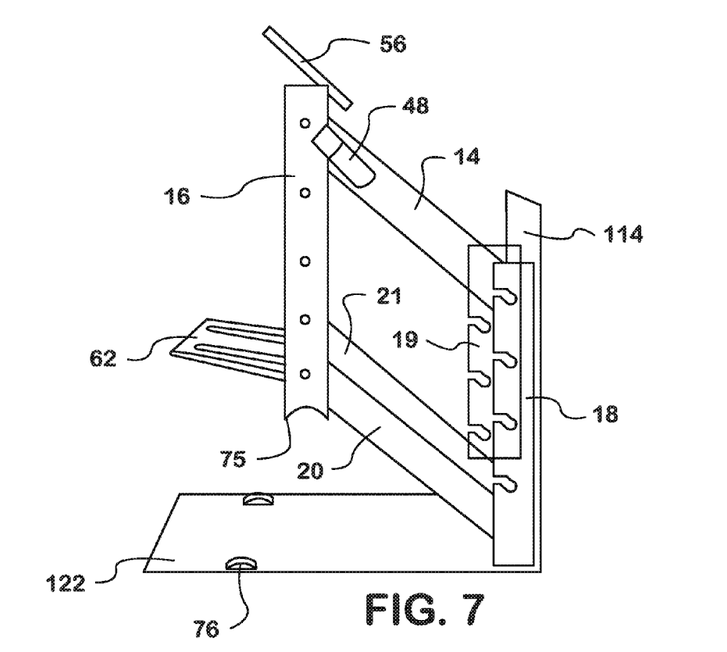
FIG. 7 is a side view of a platform assembly partially collapsed.
Figure 8:
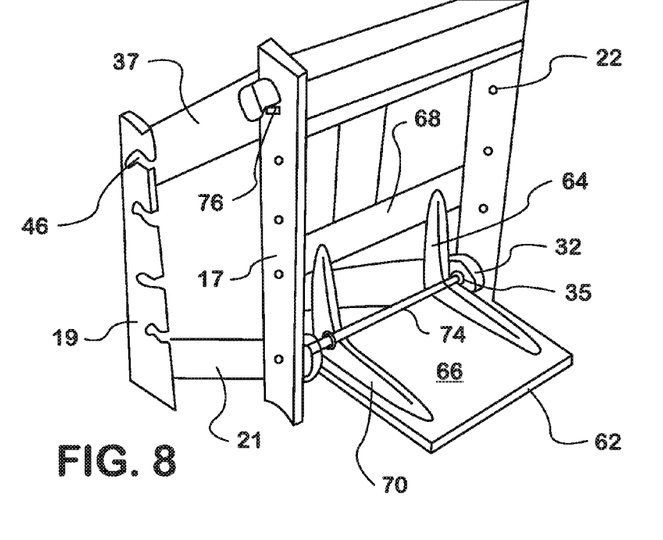
FIG. 8 is a perspective front view of a platform assembly of FIG. 6 partially collapsed.
Figure 11:
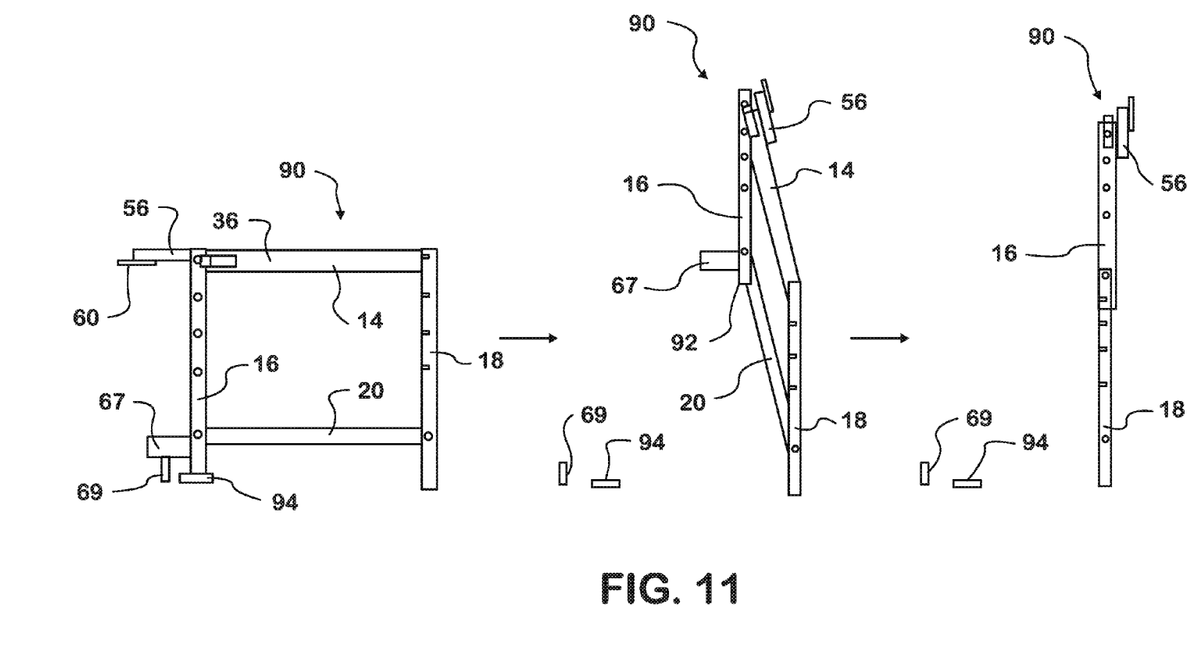
FIG. 11 is a side view of a platform assembly showing the platform assembly collapsing.

The platform assembly 90 can at least partially collapse and be moved toward the back cab wall 114. The user can close the platform extension 56 and the step 67. The user then lifts the platform assembly 90 at the platform front 38. The front legs 16, 17 pivot with the braces 20, 21 and the platform 14, such as on the rod 74 attached to the first ends 32 of the braces 20, 21 and the bores 84 in the front legs 16, 17 and the pins 78 engaging the apertures 22 and the openings 44 in the platform sides 36, 37. The back legs 18, 19 pivot with the braces 20, 21 and the platform, such as on pivot pins 78 attached to the second ends 34 of the braces 20, 21 and the bores 85 in the back legs 18, 19 and the pegs 46 engaging the slots 24. The collapsed platform assembly 90 can be secured to the back cab wall 114.

The platform assembly can collapse without the platform. The platform is removed form the platform assembly. Then, the user lifts the frame at the front legs, which pivot with the pivot connection. The front legs are moved towards the back cab wall and can be secured.

What is claimed is:
1. A platform assembly, comprising:
   a frame having a first front leg, a second front leg, a first back leg and a second back leg being spaced apart from the first front leg and the second front leg, a first brace pivotally attaching to the first front leg and pivotally attaching to the first back leg, and a second brace pivotally attaching to the second front leg and pivotally attaching to the second back leg;
   a platform removably and pivotally fastening to the frame, the platform having a first platform side, an opposite second platform side, a platform front being located between the first platform side and the second platform side, and a platform back opposite the platform front;
   each of the first front leg and the second front leg having at least one aperture;
   pins engaging the platform and one of the apertures in each of the first front leg and the second front leg;
   each of the first back leg and the second back leg having at least one slot;
   each of the first platform side and the second platform side having a peg extending therefrom near the platform back and engaging a slot;
   a step assembly pivotally engaging the first front leg and the second front leg;
   a platform extension pivotally connecting to the platform front; and a rod extending from the first front leg through the first brace through the step assembly through the second brace and engaging the second front leg wherein the step assembly further comprises:

a step;

a stop; and step brackets engaging the step and the stop and the rod.

2. The platform assembly of claim 1, further comprising:

a first bracket fastening to the first platform side and engaging the first front leg; and a second bracket fastening to the second platform side and engaging the second front leg.

3. The platform assembly of claim 1, wherein the platform assembly frame at least partially collapses by pivoting the platform on the pins engaging the apertures and the pegs engaging the slots, pivoting the first brace on a pivotal attachment with the first front leg and the pivotal attachment with first back leg, and pivoting the second brace on the pivotal attachment with the second front leg and the pivotal attachment with the second back leg.

* * * * *